(12) United States Patent
Cawthorne et al.

(10) Patent No.: US 7,908,064 B2
(45) Date of Patent: Mar. 15, 2011

(54) OPTIMAL SELECTION OF INPUT TORQUE CONSIDERING BATTERY UTILIZATION FOR A HYBRID ELECTRIC VEHICLE

(75) Inventors: William R. Cawthorne, Milford, MI (US); Anthony H. Heap, Ann Arbor, MI (US); Gregory A. Hubbard, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1138 days.

(21) Appl. No.: 11/607,726

(22) Filed: Dec. 1, 2006

(65) Prior Publication Data

US 2007/0078580 A1 Apr. 5, 2007

Related U.S. Application Data

(62) Division of application No. 10/965,674, filed on Oct. 14, 2004, now Pat. No. 7,200,476.

(60) Provisional application No. 60/511,456, filed on Oct. 14, 2003.

(51) Int. Cl.
*G06F 7/00* (2006.01)

(52) U.S. Cl. ........................................ 701/51; 180/65.24

(58) Field of Classification Search .................... 701/51, 701/54–56, 58, 22; 180/65.24, 65.8, 65.6, 180/65.1; 477/107, 110

See application file for complete search history.

(56) References Cited

U.S. PATENT DOCUMENTS

| | | | |
|---|---|---|---|
| 5,910,722 A | 6/1999 | Lyons et al. | |
| 6,154,701 A | 11/2000 | Loffler et al. | |
| 6,362,602 B1 | 3/2002 | Kozarekar | |
| 6,449,537 B1 | 9/2002 | Phillips et al. | |
| 6,480,767 B2 | 11/2002 | Yamaguchi et al. | |
| 6,518,732 B2 | 2/2003 | Palanisamy | |
| 6,662,096 B2 | 12/2003 | Komiyama et al. | |
| 6,726,592 B2 | 4/2004 | Kotani | |
| 6,825,575 B1 * | 11/2004 | Edelson | 290/40 C |
| 6,847,877 B2 | 1/2005 | Homeyer | |
| 7,070,530 B2 * | 7/2006 | Ai et al. | 475/5 |

* cited by examiner

*Primary Examiner* — Dalena Tran

(57) ABSTRACT

A preferred input torque for a hybrid powertrain is determined within a solution space of feasible input torques in accordance with a plurality of powertrain system constraints that results in a minimum overall powertrain system loss. System power losses and battery utilization costs are calculated at feasible input torques and a solution for the input torque corresponding to the minimum total powertrain system loss is converged upon to determine the preferred input torque.

16 Claims, 15 Drawing Sheets

OPTIMAL SELECTION OF INPUT TORQUE CONSIDERING BATTERY UTILIZATION FOR A HYBRID ELECTRIC VEHICLE

CROSS REFERENCE TO RELATED APPLICATIONS

The application is a divisional of and claims priority to U.S. patent application Ser. No. 10/965,674 filed on Oct. 14, 2004, now U.S. Pat. No. 7,200,476, which is hereby incorporated by reference, which claims priority to U.S. provisional patent application Ser. No. 60/511,456 filed on Oct. 14, 2003, and to U.S. patent application Ser. No. 10/779,531 filed on Feb. 14, 2004, both of which are hereby incorporated by reference in their entirety.

TECHNICAL FIELD

The present invention is related to control of a vehicular powertrain. More particularly, the invention is concerned with a vehicle powertrain and method of determining preferred operating points for the powertrain. Most particularly, the present invention is related to a vehicle powertrain and a method of determining preferred operating points for the powertrain as a function of operating parameters of the vehicle energy storage system, such as a battery pack or array.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel hybrid powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions thereby enabling high-torque continuously variable speed ratios, electrically dominated launches, regenerative braking, engine off idling, and multi-mode operation.

It is known to select engine power from the road-load power required plus an additional quantity of engine power based on the energy storage system's (e.g. battery's) state-of-charge. Following selection of engine power, the engine's optimal fuel economy or optimal emissions map or a combination thereof may be used to select the engine's torque/speed operating point. The battery power effected is that which is required, in combination with the engine power, to meet the road-load power requirements and to compensate for power losses within the system.

Known systems do not optimize the power flow of all the propulsion system components. Typically, only the engine operation is optimized. The prior art does not weigh additional factors such as other system mechanical and electrical losses and battery usage factors in selecting the overall system's preferred operating point.

A preferred method for determining input speed is disclosed in commonly assigned and co-pending U.S. patent application Ser. No. 10/686,508 and Ser. No. 10/686,034. Therein, preferred operating points for a vehicle powertrain including an engine and a transmission are determined in accordance with a comprehensive operational mapping of input and output conditions and corresponding aggregate system losses corresponding to engine and transmission losses. In a hybrid transmission application, additional losses from motors and batteries are aggregated into the system losses and battery constraints are considered in determining preferred operating points. Preferred operating points are provided in one or more sets of minimized data for on-vehicle implementation. Desired input speed is provided by the system controller, for example in accordance with a desired operating point of the engine to meet various efficiency and emission objectives.

A preferred speed control for a hybrid transmission is described in detail in commonly assigned and co-pending U.S. patent application Ser. No. 10/686,511. Therein, a multi-mode hybrid transmission is described having speed control provided via an open loop model derived as a function of preselected transmission accelerations and controlled and uncontrolled transmission torques. Motor torques are selected as the controlled torques and other preselected transmission torques are selected as the uncontrolled torques. The control also employs a closed loop control effort responsive to at least one preselected transmission speed error.

A preferred hybrid EVT powertrain system and method of its operation which considers the system as a whole in determining operating conditions is described in detail in related, commonly assigned and co-pending U.S. patent application Ser. No. 10/779,531. Optimum or preferred system operating points for a preselected powertrain operating parameter are determined through comprehensive consideration of engine, mechanical and electrical based contributory system losses. These operating points are identified by determining a feasible operating space for the preselected powertrain operating parameter, searching the feasible operating space for a value corresponding to a minimum system power loss, and establishing the preferred operating point as the value corresponding to the minimum system power loss. Preferably, the preselected powertrain operating parameter is input torque. Because of the central role of the energy storage system in a hybrid electric vehicle powertrain and the known constraints on operational life due to battery utilization and current throughput associated with repetitive charge/discharge cycles, it is desirable that the method of selecting the operating points of the powertrain corresponding to a minimum system power loss also include other empirical factors not related to actual power loss but effective to bias the minimum power loss away from input torques that are less desirable because of other considerations, such as battery use.

Therefore, it is desirable to develop a hybrid vehicle powertrain system and method of operation which incorporates selecting the operating points of the powertrain corresponding to a minimum system power loss and which also is adapted to bias the selection as a function of parameters associated with the use of the energy storage system.

SUMMARY OF THE INVENTION

The invention overcomes the deficiencies of the prior art by considering the system as a whole in determining operating conditions, particularly consideration of the utilization of the energy storage system.

In accordance with one aspect of the present invention preferred operation of the system is achieved in accordance with considering the system as a whole, and particularly consideration of energy storage system utilization, in determining operating points of the powertrain.

In a first embodiment, a powertrain system includes an electrical energy storage system and powertrain operating parameter (e.g. input torque) operating point is established in accordance with the following steps. A feasible operating space for the powertrain operating parameter is determined and corresponding energy storage system power and system power loss within the operating space are determined. An energy storage system power utilization cost as a function of energy storage system power is applied to system power loss to determine total system loss. The feasible operating space is searched for a value of the operating parameter corresponding to a minimum total system loss and the preferred operating point is determined as the value in the operating parameter corresponding to the minimum total system loss.

In another embodiment, an electrically variable transmission includes an input, an output and an electric machine having known coupling relationships, and an energy storage system. A preferred input torque for operating the electrically variable transmission is determined in accordance with the following steps. Current electrically variable transmission operating conditions, including input, output and electric machine speeds are determined. System constraints in electric machine torque, energy storage system power and input torque at current electrically variable transmission operating conditions are determined. A target output torque producible within the system constraints is provided. Aggregate system power losses corresponding to feasible input torques that can produce the target output torque within said system constraints are calculated. Energy storage system power utilization costs as a function of energy storage system power corresponding to feasible input torques and adapted for application to the aggregate system power losses, are calculated. Energy system storage power utilization costs are applied to the aggregate system power losses to determine total system losses corresponding to feasible input torques that can produce the target output torque within the system constraints. Finally, a feasible input torque corresponding to a substantially minimum total system loss is converged upon as the preferred input torque.

In yet another embodiment, a method for attributing a virtual power loss to battery utilization in a hybrid electric vehicle system for use in controlling the system includes providing a first battery power utilization cost factor as a function of battery state of charge and battery power, providing a second battery power utilization cost factor as a function of battery throughput, and determining a virtual power loss term as a function of the first and second battery power utilization cost factors and battery power. Each of the first and second battery power utilization cost factors is individually multiplied by battery power and the products thereof summed to determine the power loss term. Alternatively, the first and second battery power utilization cost factors and the battery power are multiplied together to determine the power loss term.

BRIEF DESCRIPTION OF THE DRAWINGS

FIGS. 9A-9C are graphical illustrations of various system balanced engine, battery and output power wherein FIG. 9A shows engine power greater than output power requirements wherein the excess power is used to charge the batteries, FIG. 9B shows engine power less than output power requirements wherein the power shortfall is provided by the batteries, and FIG. 9C shows engine power equaling output power requirements wherein there is no charge or discharge of the batteries;

DESCRIPTION OF THE PREFERRED EMBODIMENT

Figure 1:
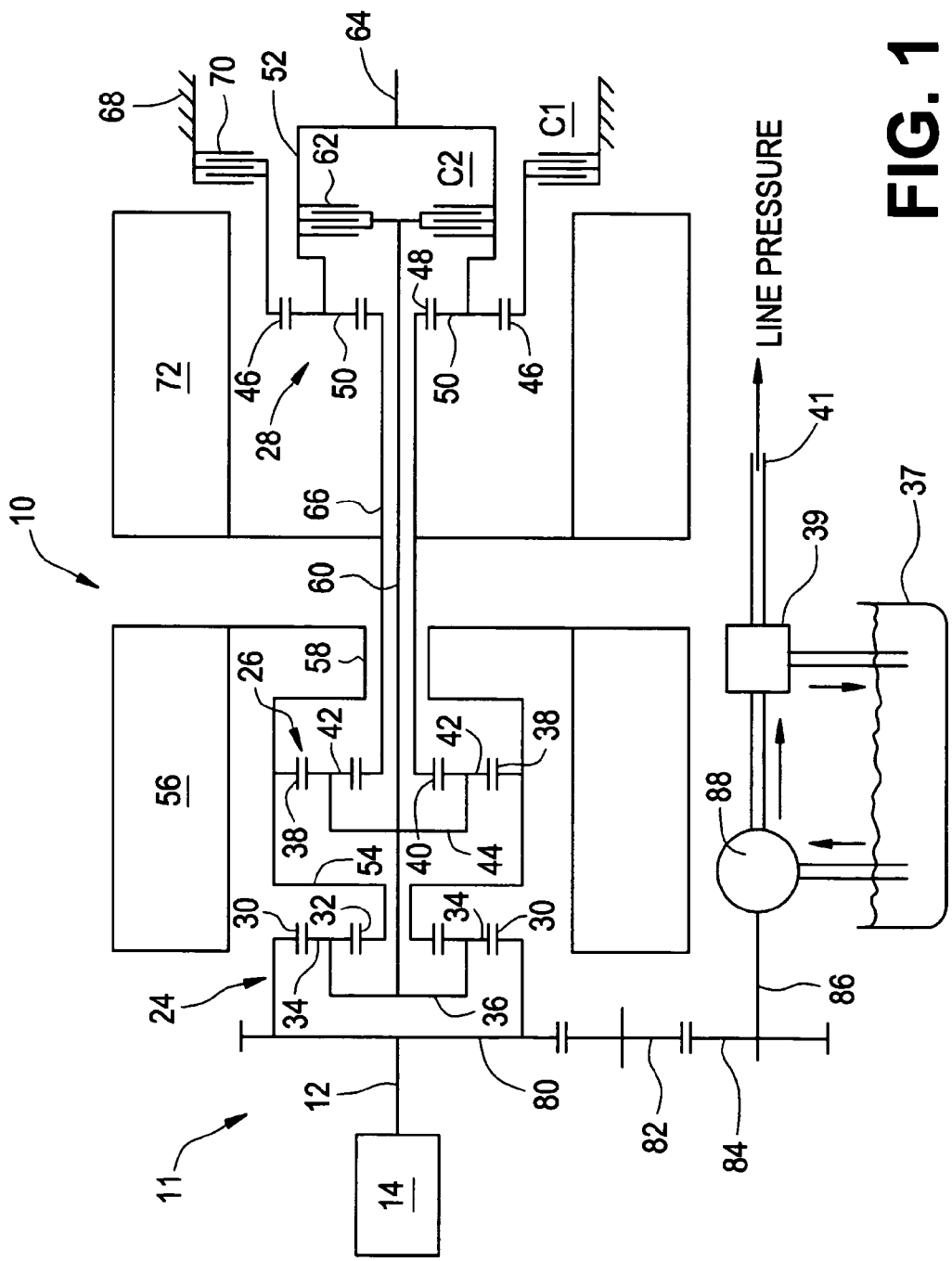
FIG. 1 is a mechanical hardware schematic representation of one preferred form of a two-mode, compound-split, electrically variable transmission particularly suited to the implementation of the present invention.
Figure 2:
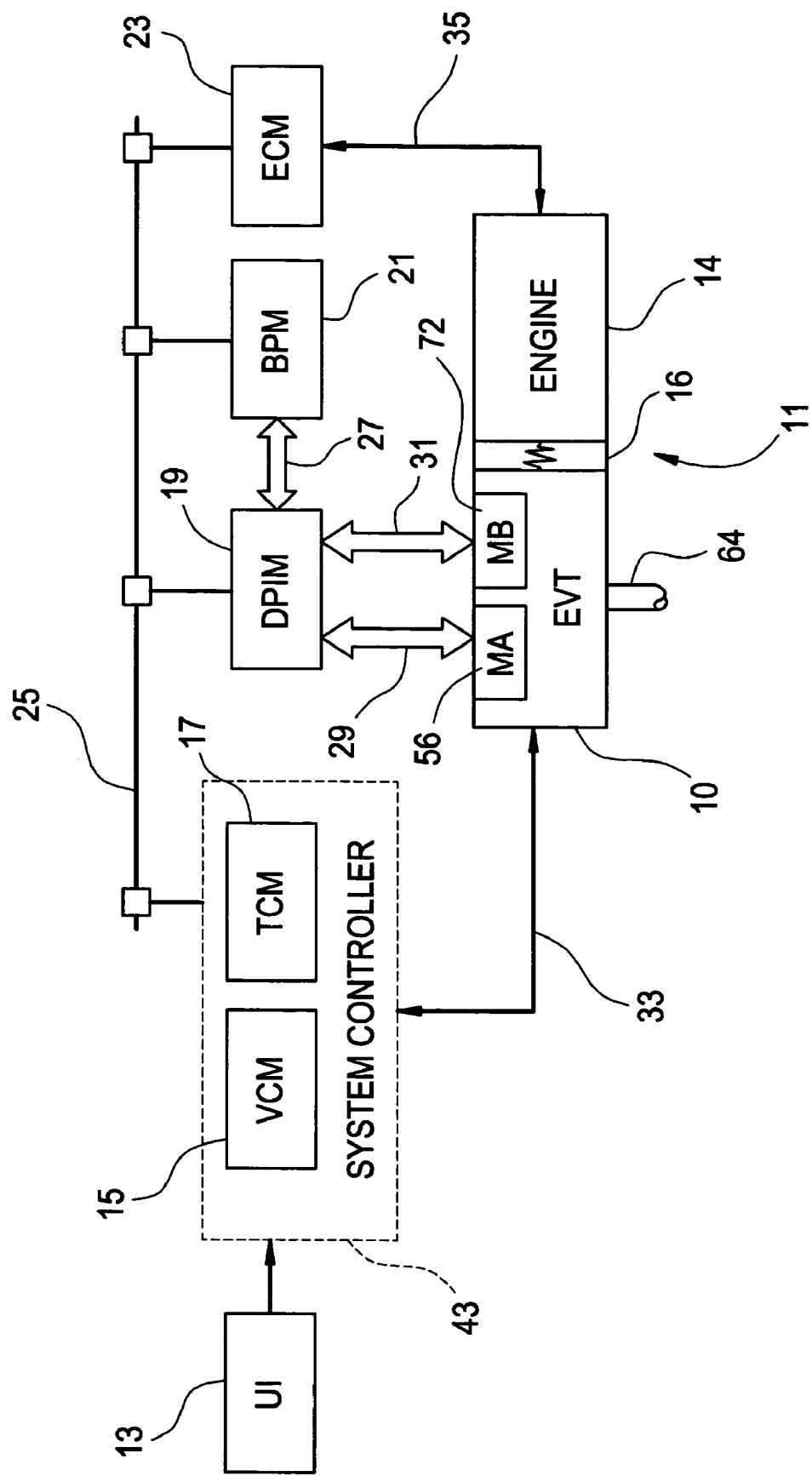
FIG. 2 is an electrical and mechanical schematic of a preferred system architecture for the hybrid powertrain disclosed herein.

With reference first to FIGS. 1 and 2, a vehicular powertrain system is generally designated 11. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those figures, the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input—operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First motor/generator 56 may also be referred to herein variously as motor A or MA.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 52 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72. Second motor/generator 72 may also be referred to herein variously as motor B or MB. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e.: the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28. As used herein, when a mode related to a gear train is referenced an upper case designation MODE 1 or MODE 2, or M1 or M2, will generally be used.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Engine 14 is preferably a diesel engine and electronically controlled by engine control module (ECM) 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well known torque based controls for engine 14 in response to a torque command Te_cmd provided by the EVT control system. Such engine electronics, controls and quantities are generally well known to those skilled in the art and further detailed exposition thereof is not required herein As should be apparent from the foregoing description the EVT 10 selectively receives power from the engine 14. As will now be explained with continued reference to FIG. 2 the EVT also receives power from an electric storage device such as one or more batteries in battery pack module (BPM) 21. The powertrain system also includes such energy storage devices which are an integral part of the power flows thereof. Other electric storage devices that have the ability to store electric power and dispense electric power may be used in place of the batteries without altering the concepts of the present invention. The BPM 21 is high voltage DC coupled to dual power inverter module (DPIM) 19 via DC lines 27. Current is transferable to or from the BPM 21 in accordance with whether the BPM 21 is being charged or discharged. DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 3 l and provides current to the DC lines 27. The net DC current provided to or from the inverters determines the charge or discharge operating mode of the BPM 21. Preferably, MA and MB are three-phase AC machines and the inverters comprise complementary three-phase power electronics. Individual motor speed signals Na and Nb for MA and MB, respectively, are also derived by the DPIM 19 from the motor phase information or conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor based controllers designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, System controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Trim valves are preferably employed using variable bleed solenoids to provide precise placement of the spool within the valve body and correspondingly precise control of clutch pressure during apply. Similarly, line pressure regulator 39 may be of a solenoid controlled variety for establishing regulated line pressure in accordance with the described PWM signal. Such line pressure controls are generally well known to those skilled in the art. Clutch slip speeds across clutches C1 and C2 are derived from output speed No, MA speed Na and MB speed Nb; specifically, C1 slip is a function of No and Nb, whereas C2 slip is a function of No, Na and Nb. Also illustrated is user interface (UI) block 13 which comprises such inputs to system controller 43 such as vehicle throttle position, push button shift selector (PBSS) for available drive range selection, brake effort and fast idle requests among others.

System controller 43 determines a torque command Te_cmd and provides it to ECM 23. Torque command Te_cmd is representative of the EVT torque contribution desired from the engine as determined by the system controller. System controller 43 also determines a speed command Ne_des representative of the EVT input speed desired, which in the direct coupled arrangement between the engine and the EVT is also the desired engine speed operating point. With the direct coupled arrangement exemplified herein, the engine torque and the EVT input torque, Te and Ti respectively, are equivalent and may be referred to in the alternative herein. Similarly, the engine speed and the EVT input speed, Ne and Ni respectively, are equivalent and may be referred to in the alternative herein. Desired input speed operating points are preferably determined as disclosed in commonly assigned and co-pending U.S. patent application Ser. No. 10/686,508 and Ser. No. 10/686,034 which are incorporated herein by reference. A preferred speed control for a hybrid transmission is described in detail in commonly assigned and co-pending U.S. patent application Ser. No. 10/686,511 which is incorporated herein by reference.

The various modules described (i.e. system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example the preferred protocol for heavy duty applications is the Society of Automotive Engineers standard J1939. The CAN bus and appropriate protocols provide for robust messaging and multi-controller interfacing between the system controller, ECM, DPIM, BPIM and other controllers such as antilock brake and traction controllers.

Figure 3:
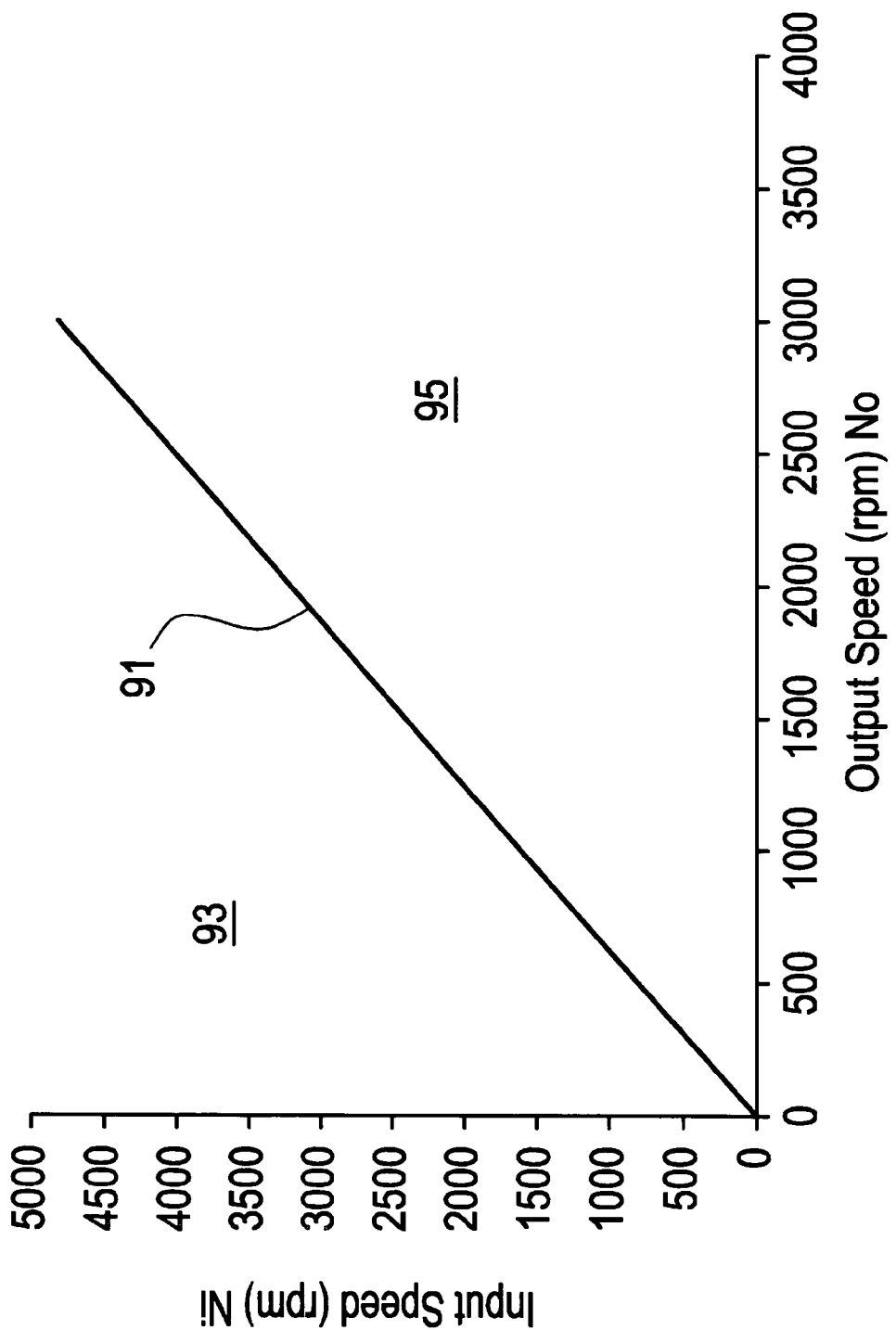
FIG. 3 is a graphical representation of various regions of operation with respect to input and output speeds of the exemplary electrically variable transmission disclosed herein.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be effected by simultaneous application of both clutches C1 and C2, also known as fixed-ratio. One particular gearset relationship capable of producing the synchronous operation depicted by line 91 in FIG. 3 is as follows: outer gear member 30 having 91 teeth, inner gear member 32 having 49 teeth, planet gear members 34 having 21 teeth; outer gear member 38 having 91 teeth, inner gear member 40 having 49 teeth, planet gear members 42 having 21 teeth; outer gear member 46 having 89 teeth, inner gear member 48 having 31 teeth, planet gear members 50 having 29 teeth. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited.

While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g. mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g. mass, size, cost, inertial capabilities, etc.) to the high speeds of region 93. Region 93, wherein MODE 1 operation is generally preferred, may be considered a low speed region whereas region 95, wherein MODE 2 operation is generally preferred, may be considered a high speed region. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

As a starting point for the present control, various powertrain parameters are measured or otherwise predetermined. Output speed, No, and input speed, Ni, are preferably derived from sensed and filtered signals. Motor speeds Na and Nb are known through sensing, calculated with known coupling constraints of the EVT, or derived through the motor control phase information. Input acceleration, Ni_dot, is preferably a desired rate of change of transmission input speed determined as taught in commonly assigned and co-pending U.S. patent application Ser. No. 10/686,511. Output speed acceleration, No_dot, is preferably determined in accordance with sensed and filtered output speed, No, also as disclosed in commonly assigned and co-pending U.S. patent application Ser. No. 10/686,511.

Figure 7:
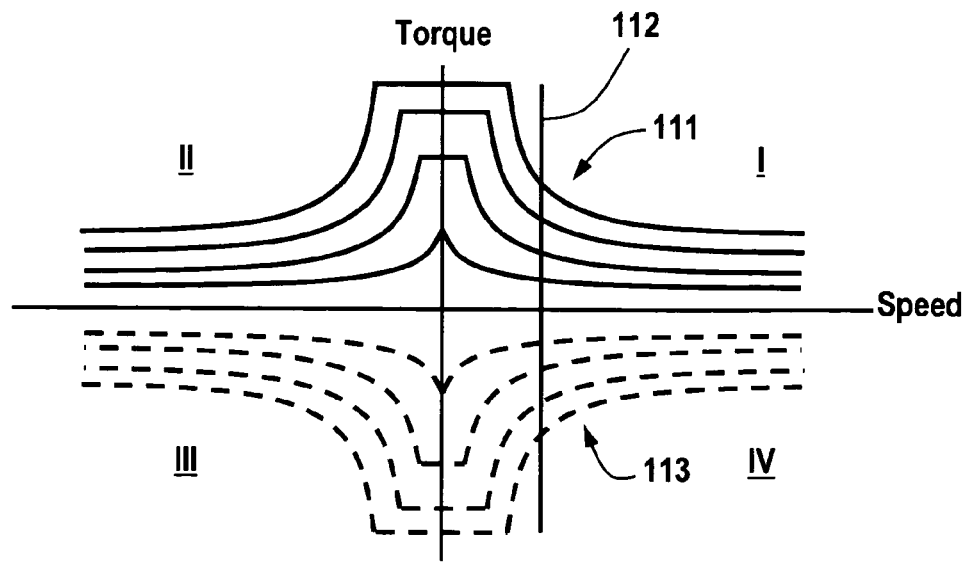
FIG. 7 is a graphical depiction of empirically determined motor torque vs. speed characteristic data utilized in the determination of feasible operating space in accordance with the present invention.

Minimum and maximum motor torques (Ta_min, Ta_max, Tb_min and Tb_max) within the present condition capabilities of the motors are preferably obtained from data sets stored in table form within data structures in system controller 43. Such data sets are provided for reference by the routine in pre-stored table format having been empirically derived from conventional dynamometer testing of the combined motor and power electronics (e.g. power inverter) at various temperature and voltage conditions. An exemplary representation of such characteristic motor torque vs. speed data is illustrated in FIG. 7 wherein minimum and maximum data for a given speed are represented by the line of constant speed 112 intersecting exemplary lines of constant temperature/voltage 111, 113. The tabulated data is referenced by the motor speed (Na, Nb), voltage and temperature. Motor speeds can be derived from the input speed Ni and output speed No in accordance with the following known coupling constraint equation:

$$\begin{bmatrix} Na \\ Nb \end{bmatrix} = \begin{bmatrix} K_{11} & K_{12} \\ K_{21} & K_{22} \end{bmatrix} \begin{bmatrix} Ni \\ No \end{bmatrix}$$

where Na is motor A speed,
  Nb is motor B speed,
  Ni is EVT input speed,
  No is EVT output speed, and
  Kn is a 2×2 matrix of parametric values determined by the hardware gear and shaft interconnections.

While the motors are used in both motoring and generating modes—suggesting four-quadrants (I, II, III, IV) of torque/speed data—two quadrant data collection is generally sufficient wherein the data collected in adjacent quadrants is merely reflected in the other quadrants not directly measured. In the present example, quadrants I and II are shown with determined data 111 whereas quadrants III and IV are shown populated with reflected data 113 therefrom.

Minimum and maximum battery power, Pbatt_min and Pbatt_max, within the present condition capabilities of the batteries are preferably obtained from data sets stored in table form within data structures in system controller 43. Such data sets are provided for reference by the routine in pre-stored table format having been correlated to various conditions, e.g. state of charge, temperature, voltage and usage (amp-hour/hour). A preferred method of determining minimum and maximum battery power is disclosed in commonly assigned and co-pending U.S. patent application Ser. No. 10/686,180 which is incorporated herein by reference.

Figure 4:
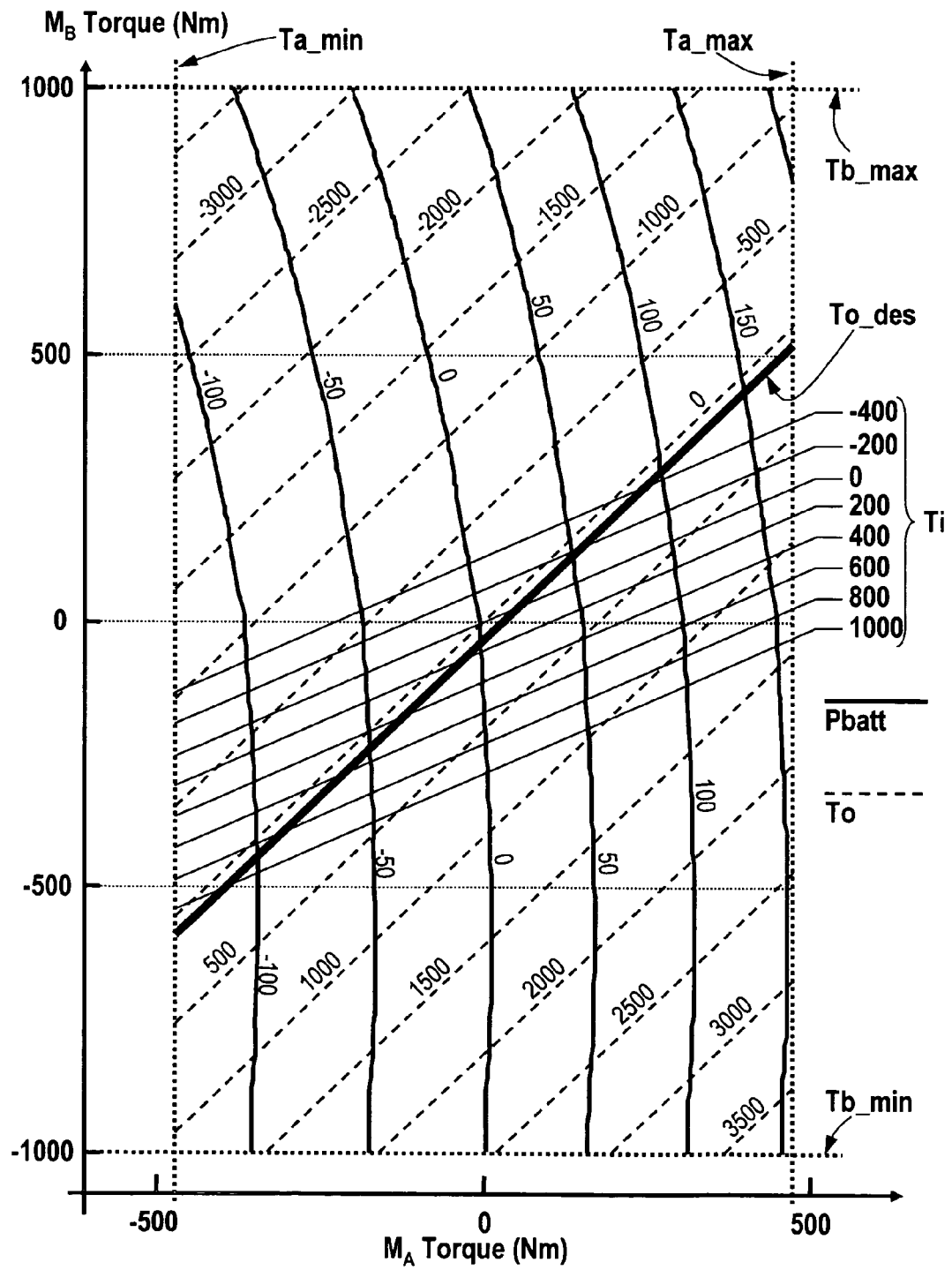
FIG. 4 is a torque space plot in motor torques (Ta and Tb) including exemplary lines of constant battery power (Pbatt), exemplary lines of constant output torque (To) and exemplary lines of constant engine torque (i.e. input torque Ti)

With reference now to FIG. 4, motor a ($M_A$) torque is plotted across the horizontal axis and motor a ($M_B$) torque is plotted across the vertical axis. Boundaries are drawn as dotted lines corresponding to minimum and maximum motor A torques (Ta_min and Ta_max), the minimum and maximum being with respect to motor capabilities at certain exemplary present operating conditions in Ni, No, Ni_dot and No_dot, the precise values of which are not required for the present exposition of the teachings to be gained from FIG. 4 and the present discussion. Similar boundaries are drawn as dotted lines corresponding to such minimum and maximum motor B torques (Tb_min and Tb_max). The enclosed space represents a feasible solution space at present conditions for the motor units MA and MB. Once again, the precise values used herein are not critical to the understanding to be gained from the present description and figure, but are provided for appropriate context and to reduce the teaching's abstraction.

Within this motor torque solution space are plotted several other parameter lines of constant values which similarly are provided with exemplary values which are not critical to the understanding to be gained from the present description and figure but which are provided for appropriate context and reduction in abstraction of the present teaching. A plurality of lines of constant battery power, Pbatt, is plotted which represent constant battery power solutions within the feasible solution space in Ta and Tb. Also plotted within this motor torque solution space are lines of constant output torque, To, which represent constant output torque solutions within the feasible solution space in Ta and Tb. Finally, lines of constant input torque are plotted within the same feasible solution space in Ta and Tb and represent constant input torque solutions therein. In the graphic representation of FIG. 4, while the space with respect to Ta and Tb is feasible in accordance with the capabilities of the respective motor units, the lines of constant battery power (Pbatt), lines of constant output torque (To) and lines of constant input torque (Ti) are not necessarily representative of feasible solutions with respect to their respective subsystem capabilities at present conditions. But for the sake of clarity in FIG. 4, the lines of constant input torque, Ti, are limited to feasible solutions of input torques, e.g. −400 Nm to 1000 Nm in the present example.

With continued reference to FIG. 4, a desired output torque, To_des, is plotted and represented in the figure as a thick solid line. To_des represents the system constrained output torque target for the control. It may correspond to the torque requested by the vehicle operator in the event that the request is within the system's capabilities. But it may correspond to a constrained output torque in accordance with system limits. To_des may also be constrained in accordance with other factors apart from system capabilities such as vehicle driveability and stability considerations. Constrained output torques may be determined in accordance with minimum and maximum input torque capabilities at present operating conditions (Ti_min, Ti_max), minimum and maximum motor torques at present operating conditions (Ta_min, Ta_max, Tb_min, Tb_max) and minimum and maximum battery power capabilities at present operating conditions (Pbatt_min, Pbatt_max).

It is along this To_des line that the feasible solution space within Ta and Tb is presently relevant. Similarly, it is along this To_des line that that the feasible input torques, −400 Nm>Ti>1000 Nm are presently relevant. It is also along this To_des line that the feasible battery powers, Pbatt_min>Pbatt>Pbatt_max are presently relevant. The overall feasible solution space for To_des, therefore, is variously bounded by present capabilities as presented as minimum and maximum motor unit torques, input torques, and battery powers.

Figure 15:
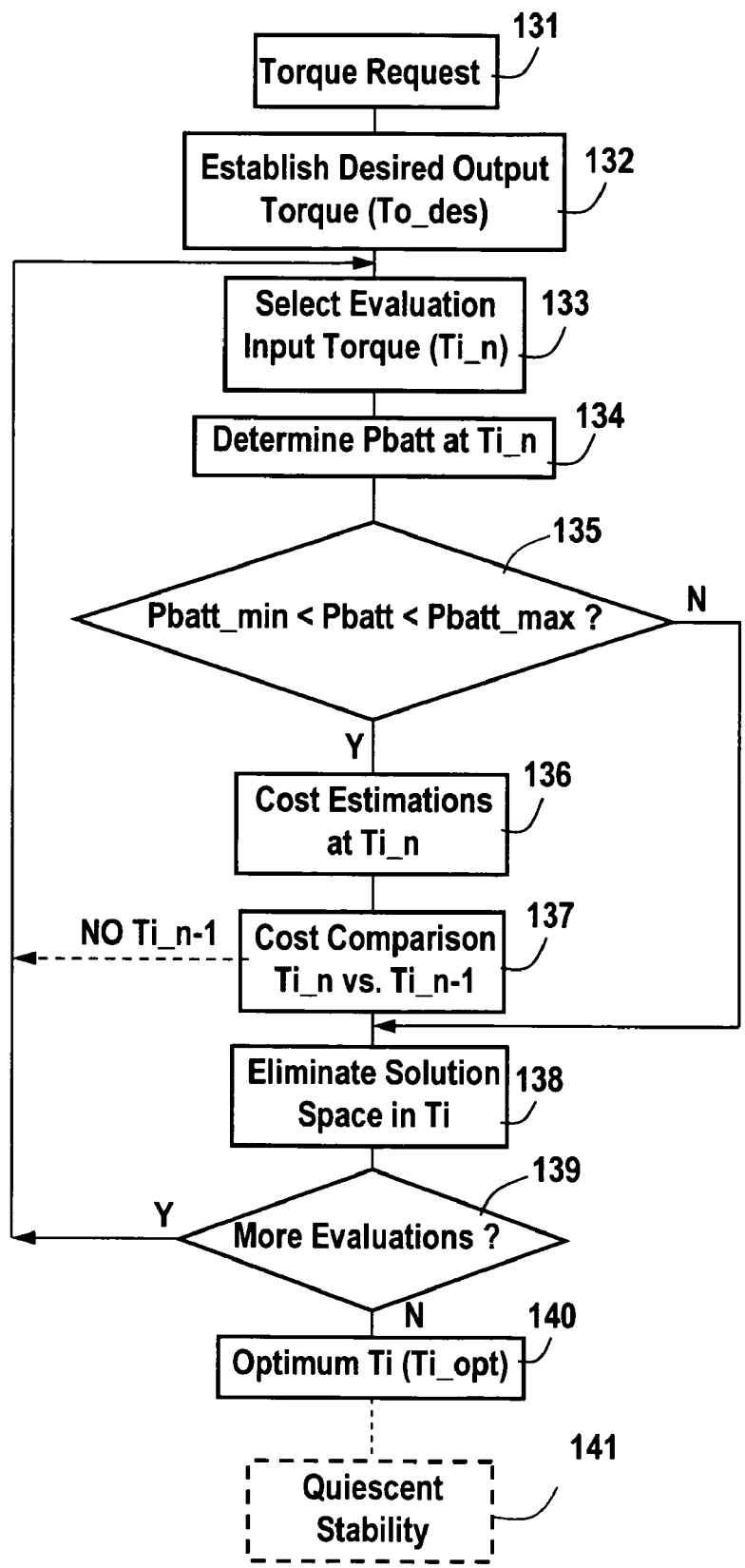
FIG. 15 illustrates a flowchart of exemplary steps in a set of instructions executed by a computer based controller particularly related to determining an optimum powertrain operating parameter in accordance with the present invention.

Within this feasible solution space it is desirable to determine an optimum operating point for input torque. A preferred method for determining input torque within a feasible solution space as described is set forth below in reference to the flow chart of FIG. 15. The flow chart illustrates representative steps for carrying out the method of the present invention comprising instructions implemented as part of the executable computer code and data structures of system controller 43. The instructions represented thereby are, of course, executed as a part of a much larger group of instruction sets and routines carrying out the various control and diagnostic function of the powertrain previously described.

Beginning with step 131 the operator request for output torque is determined. Preferably, a torque request is resolved from a plurality of operator inputs including: accelerator pedal position, brake pedal position and shift selector position; vehicle dynamic conditions such as acceleration rate or deceleration rate; and, EVT operational conditions such as temperatures, voltages, currents and speeds.

At step 132 the desired output torque (To_des) is determined. The requested torque from step 131 is evaluated and subjected to a variety of limit tests to ensure that the resultant desired output torque is within various system constraints. The constraints include input torque maximums and minimums as determined in accordance with present operating conditions for the engine including predominantly actual engine speed Ne (input speed Ni). The constraints further include motor minimum and maximum torques and minimum and maximum battery powers.

A section search is preferably performed with the objective of quickly converging upon a preferred input torque operating point as described below. Within the maximum and minimum input torque limits, Ti_min and Ti_max, already established, an evaluation input torque, Ti_n, is selected at step 133. Evaluation input torque are preferably established in accordance with the well known golden section ratio wherein the entire range of remaining feasible input torques, (Ti_min to Ti_max in the initial iteration) is effectively divided into two regions having the ratios $\Phi$ and 1-$\Phi$ with respect to the whole region wherein $$\Phi=(\sqrt{5}-1)/2 \text{ which is approximately equal to } 0.61803$$
...

In subsequent iterations, the $\Phi$ ratio section is measured off with respect to a newly established boundary of the region to be evaluated as explained at a later point more fully in conjunction with the illustration of FIG. 6.

At step 134, battery power Pbatt is next determined at the selected evaluation input torque, Ti_n. The following coupling constraint equation is known for the EVT for calculating the motor A and motor B torques:

$$\begin{bmatrix} Ta \\ Tb \end{bmatrix} = \begin{bmatrix} K_{11} & K_{12} & K_{13} & K_{14} \\ K_{21} & K_{22} & K_{23} & K_{24} \end{bmatrix} \begin{bmatrix} Ti \\ To \\ Ni\_dot \\ No\_dot \end{bmatrix}$$

where Ta is motor A torque;
Tb is motor B torque;
Ti is EVT input torque;
To is EVT output torque;
Ni_dot is EVT input acceleration;
No_dot is EVT output acceleration; and,
Kn is a 2×4 matrix of parametric values determined by the hardware gear and shaft interconnections and estimated hardware inertias applicable to the current drive range and represents what is commonly referred to as the plant model.

Additionally, motor speeds are derived from the following known coupling constraint equation:

$$\begin{bmatrix} Na \\ Nb \end{bmatrix} = \begin{bmatrix} K_{11} & K_{12} \\ K_{21} & K_{22} \end{bmatrix} \begin{bmatrix} Ni \\ No \end{bmatrix}$$

where Na is motor A speed;
Nb is motor B speed;
Ni is EVT input speed;
No is EVT output speed; and,
Kn is a 2×2 matrix of parametric values determined by the hardware gear and shaft interconnections.

Battery power at the evaluation input torque is determined in accordance with the following relationship:

$$Pbatt=Pmotor\_A+Ploss\_A+Pmotor\_B+Ploss\_B+Ploss\_acc$$

where Pmotor_A and Pmotor_B are unit A and unit B motor power,
respectively;
Ploss_A and Ploss_B are unit A and unit B aggregate motor and power electronics losses (motor losses), respectively; and,
Ploss_acc is modeled as a DC load, e.g V*I, representing battery draw to power accessories or any other load upon the batteries not directly related to the motor units A and B.

Motor powers are determined in accordance with the following relationships:

$$Pmotor\_A=Ta*Na; \text{ and,}$$

$$Pmotor\_B=Tb*Nb$$

where motor speeds, Na and Nb, and motor torques, Ta and Tb, are derived from the two coupling constraint equations shown above.

Figure 16:
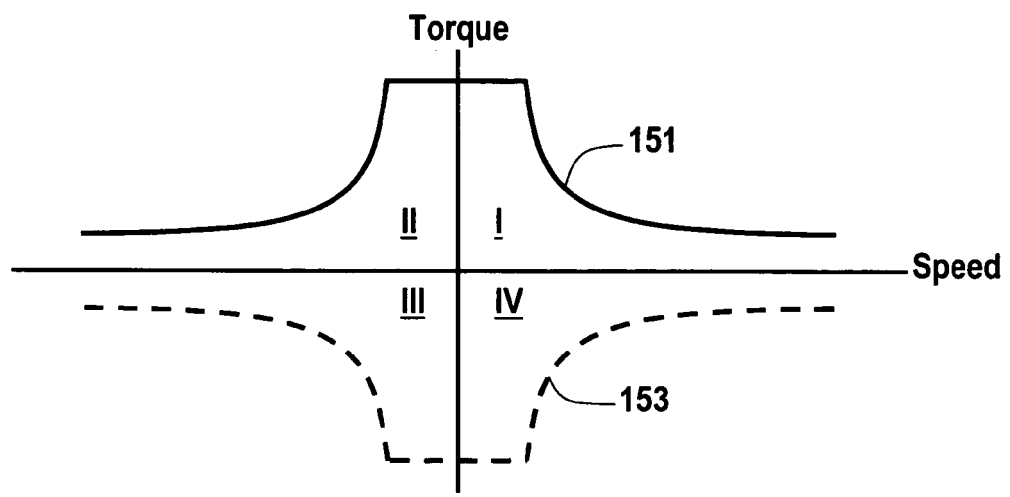
FIG. 16 is a graphical depiction of empirically determined motor torque vs. speed characteristic data utilized in the determination of motor losses in accordance with the present invention; and, FIGS. 17A and 17B illustrate a flowchart of exemplary steps in a set of instructions executed by a computer based controller particularly related to stability of power flow in accordance with the present invention.

Motor losses are provided for reference by the routine in pre-stored table format indexed by the motor torque and motor speed, having been empirically derived from conventional dynamometer testing of the combined motor and power electronics (e.g. power inverter). An exemplary representation of such characteristic motor torque vs. speed data is illustrated in FIG. 16. The tabulated data is referenced by the motor torque (Ta, Tb) and motor speed (Na, Nb). The difference between the electrical power input (Ia*V and Ib*V) and the motor shaft mechanical power output (Ta*Na and Tb*Nb) equates to the motor power loss (Ploss_A, Ploss_B) as follows:

$$Ploss\_A=Ia*V-Pmotor\_A; \text{ and,}$$

$$Ploss\_B=Ib*V-Pmotor\_B$$

where Ia and Ib are the currents delivered to motor A and motor B power inverters, respectively; and,
V is the voltage at which the currents are provided.

While the motors are used in both motoring and generating modes—suggesting four-quadrants (I, II, III, IV) of torque/speed data—two quadrant data collection is generally sufficient wherein the data collected in adjacent quadrants is merely reflected in the other quadrants not directly measured. In the present example, quadrants I and II are shown with determined data 151 whereas quadrants III and IV are shown populated with reflected data 153 therefrom.

At this point at step 135 performs an evaluation of the battery power Pbatt just determined by comparing the battery power to the battery power constraints or limits, Pbatt_min and Pbatt_max, at the present conditions. If battery power for the evaluated input torque is not within the limits, then the routine skips to step 138 whereat the present evaluation input torque Ti_n establishes a new input torque boundary for the range of remaining feasible input torques to be evaluated. An acceptable battery power otherwise results in control passing to cost estimation step 136 whereat various subsystem power losses and other subjective costs are determined for the evaluation input torque.

One objective of the present step 136 is to determine an overall system power loss comprising a summation of individual subsystem power losses as follows:

$$Ploss\_total=Ploss\_evt+Ploss\_eng+Ploss\_A+Ploss\_B+Ploss\_batt$$

where Ploss_evt represents EVT losses such as hydraulic pumping loss, spin loss, clutch drag, etc.;

Ploss_eng represents engine losses associated with operating away from the most efficient Brake Specific Fuel Consumption (BSFC) point;

Ploss_A represents motor A losses;

Ploss_B represents motor B losses; and,

Ploss_batt represents internal power losses for the batteries.

The EVT losses (Ploss_evt) are provided for reference by the routine in pre-stored table format indexed by Ni and No, having been empirically derived from conventional dynamometer testing of the EVT unit throughout its various modes of operation and within the effective gear ratio ranges associated therewith.

The engine power losses (Ploss_eng) also are determined in accordance with pre-stored tabulated data. The engine power losses are provided for reference by the routine in pre-stored table format indexed by Ti and Ni. The preferred manner of generating such tables is through application of a loss equation as follows for calculation of engine power loss:

$$P\text{loss\_eng} = \eta_{MAX} LHV(kJ/g) Q_{FUEL}(g/s) - P_{OUT}$$

where $\eta_{MAX}$ is the engine's maximum efficiency;

$LHV(kJ/g)$ is the fuel's lower heating value;

$Q_{FUEL}(g/s)$ is the fuel flow rate at operational conditions; and, $P_{OUT}$ is the engine mechanical shaft output power at operational conditions.

Conventional dynamometer testing is employed to establish the baseline $\eta_{MAX}$ and in the gathering and tabulation of the relative engine losses. Ploss_evt and Ploss_eng may also be combined into a single mechanical loss term or grouped together and referred to as Ploss_eng.

The motor losses are determined, stored and referenced as previously described.

Figure 8:
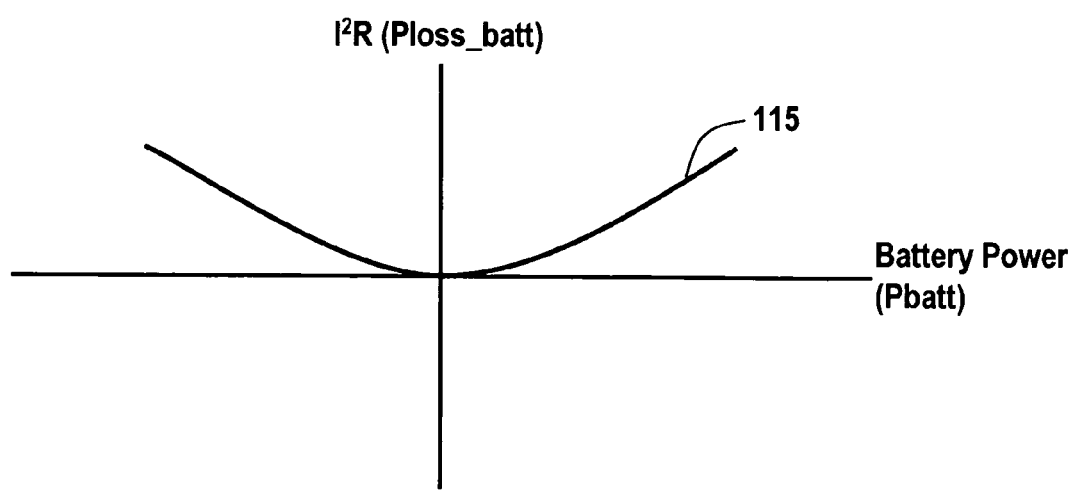
FIG. 8 is a graphical representation of battery power losses vs. battery power characteristic data utilized in the determination of battery power losses in accordance with the present invention.
Figure 9A:
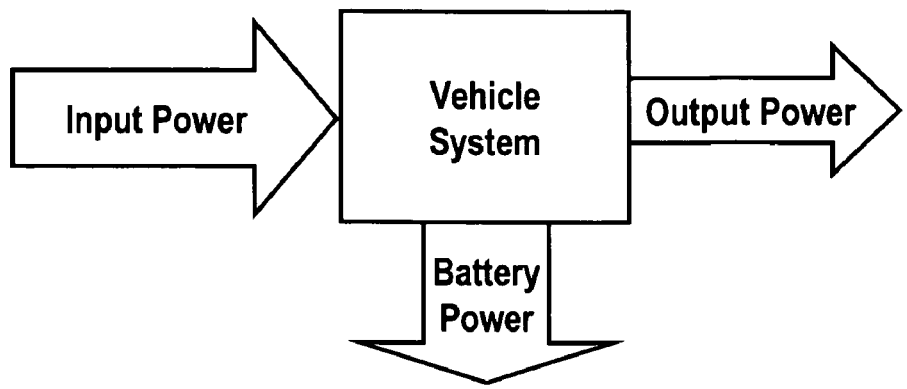
Figure 9B:
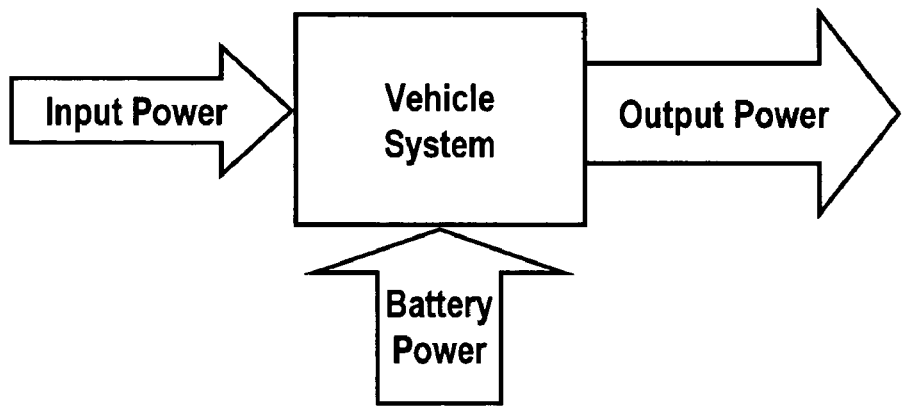
Figure 9C:
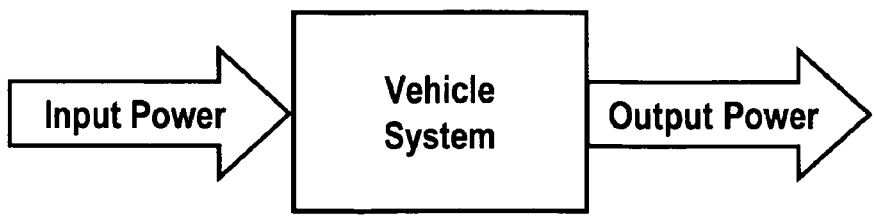

The internal power losses for batteries, Ploss_batt, are commonly referred to as $I^2R$ losses. Ploss_batt data are provided for reference by the routine in pre-stored table format generated from battery equivalence models and indexed by battery power, Pbatt. An exemplary representation of such characteristic battery power vs. loss data 115 is illustrated in FIG. 8.

Figure 5:
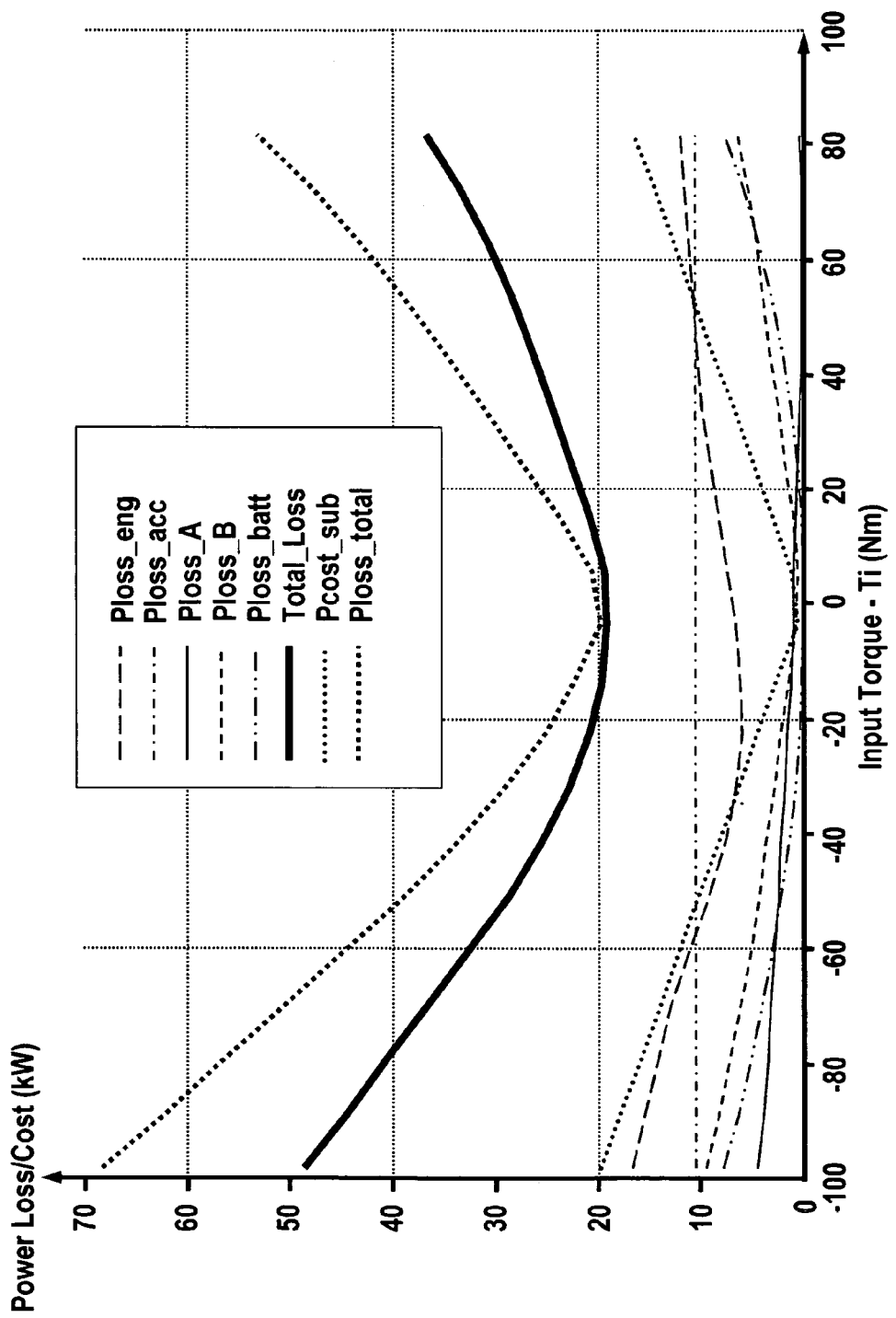
FIG. 5 is a plot of exemplary individual sub-system costs and aggregate system costs correlated to power across an input torque range useful in determining an optimum input torque operating point at a set of current system speeds and accelerations.

Exemplary subsystem power losses are illustrated across an exemplary input torque region in FIG. 5.

Continuing at step 136 and with further reference to FIGS. 9-14, additional subjective costs are preferably calculated to be factored into the selection of an optimum input torque operating point in accordance with the present invention. Subjective costs are penalties, unlike the subsystem power losses described up to this point, cannot be derived from physical loss models, but rather represent another form of penalty against operating the system at particular points. For example, in an energy storage system (ESS), such as BPM 21, factors such as extreme states of charge (SOC), voltage, and current can damage the batteries. In addition, the life of the batteries is related to the amp-hour throughput of the batteries. Thus, it is important for the vehicle control system to manage the batteries in such a way that these parameters are maintained within specified ranges to avoid damage to the system. Protection algorithms for the batteries are designed to ensure that the power limits are adjusted such that the limits on each of these parameters are not violated. However, the protection algorithms do not direct the operation of the system when the particular battery parameters are between the prescribed limits. A battery cost or penalty may be used to direct the selection of the operating point of the vehicle system (within the prescribed limits) based on the battery usage of the particular operating point and the associated impact or cost of the usage on the batteries. The battery cost may be based on any cost factor or parameter related to the batteries, including operating or performance factors or parameters, as well as factors or parameters associated with actual costs associated with the batteries or their service or maintenance, but will include at least one such cost factor or parameter. It is preferred to utilize at least one of, and most preferably both of, a state of charge (SOC) of the batteries and the amp-hour per hour (Amp-hr/hr) throughput of the batteries, as these are the battery parameters which are most affected by the selection of the operating point of the vehicle. For example, as illustrated in FIGS. 9A-9C, for a particular output speed and torque requirement, a number of different input speed and torque points can be selected for operating the system. Some of these operating points will be such that the input power exceeds the output power. In this case, the excess power is used to charge the batteries, as illustrated in FIG. 9A. In other cases, the input power will be less than the output power and the deficit is made up by the batteries, as illustrated in FIG. 9B. Finally, some cases will result in the input power being equal to the output power and the batteries will not charge or discharge, as illustrated in FIG. 9C. In these examples, the effects of losses are neglected.

Figure 10:
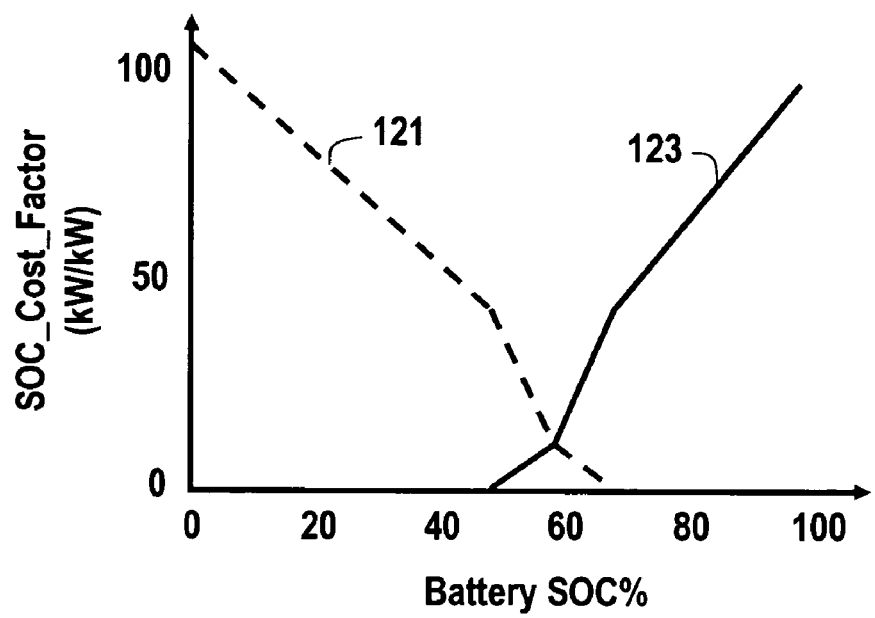
FIG. 10 is a graphical representation of state of charge cost factors across the range of battery states of charge attributed to battery power flows and as utilized in a first determination of battery utilization costs in accordance with the present invention.
Figure 11:
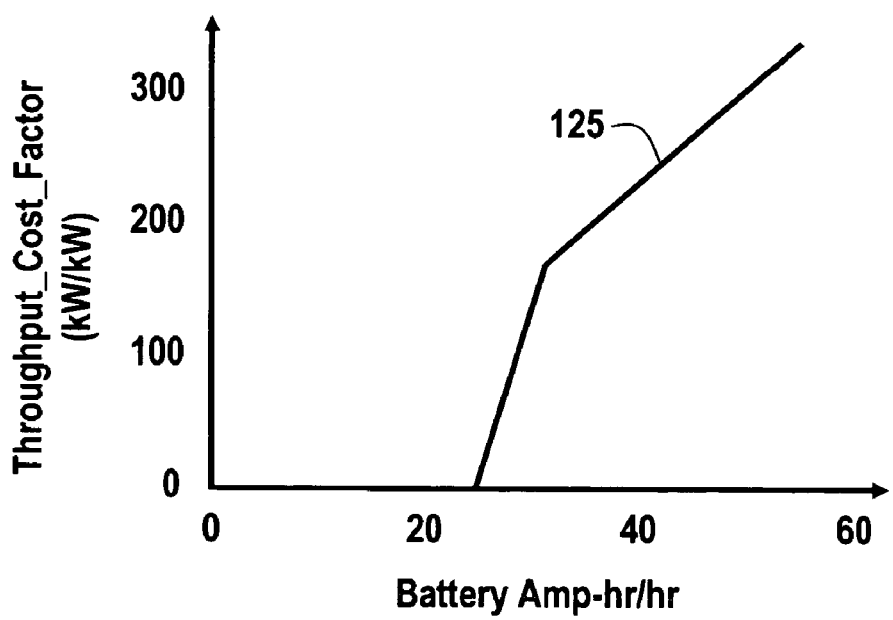
FIG. 11 is a graphical representation of battery throughput cost factors across the range of battery throughput as utilized in a first determination of battery utilization costs in accordance with the present invention.

As illustrated in FIG. 10, in a first embodiment, a first battery cost factor term, SOC_Cost_Factor, penalizes charging at high states of charge (solid line 123 in FIG. 10) and penalizes discharging at low states of charge (broken line 121 in FIG. 10). A second battery cost factor term, Throughput_Cost_Factor, captures the effect of battery usage and assigns appropriate penalties thereto (line 125 in FIG. 10). Battery usage is preferably measured in terms of average battery current (Amp-hr/hr), and a penalty placed on average battery current operating points that increases with higher battery current. Such cost factors are preferably obtained from data sets stored in table form within data structures in system controller 43. Such data sets are provided for reference by the routine in pre-stored table format. The product of the respective cost factors and battery power yields the cost function terms, Pcost_SOC and Pcost_throughput.

In this embodiment, the total subjective cost is determined in accordance with the summation of the individual subjective costs in the following example of SOC and throughput penalties:

$$P\text{cost\_sub} = P\text{cost\_SOC} + P\text{cost\_throughput}$$

where: Pcost_SOC=Pbatt*SOC_Cost_Factor; and,

Pcost_throughput=Pbatt*Throughput_Cost_Factor.

Figure 12:
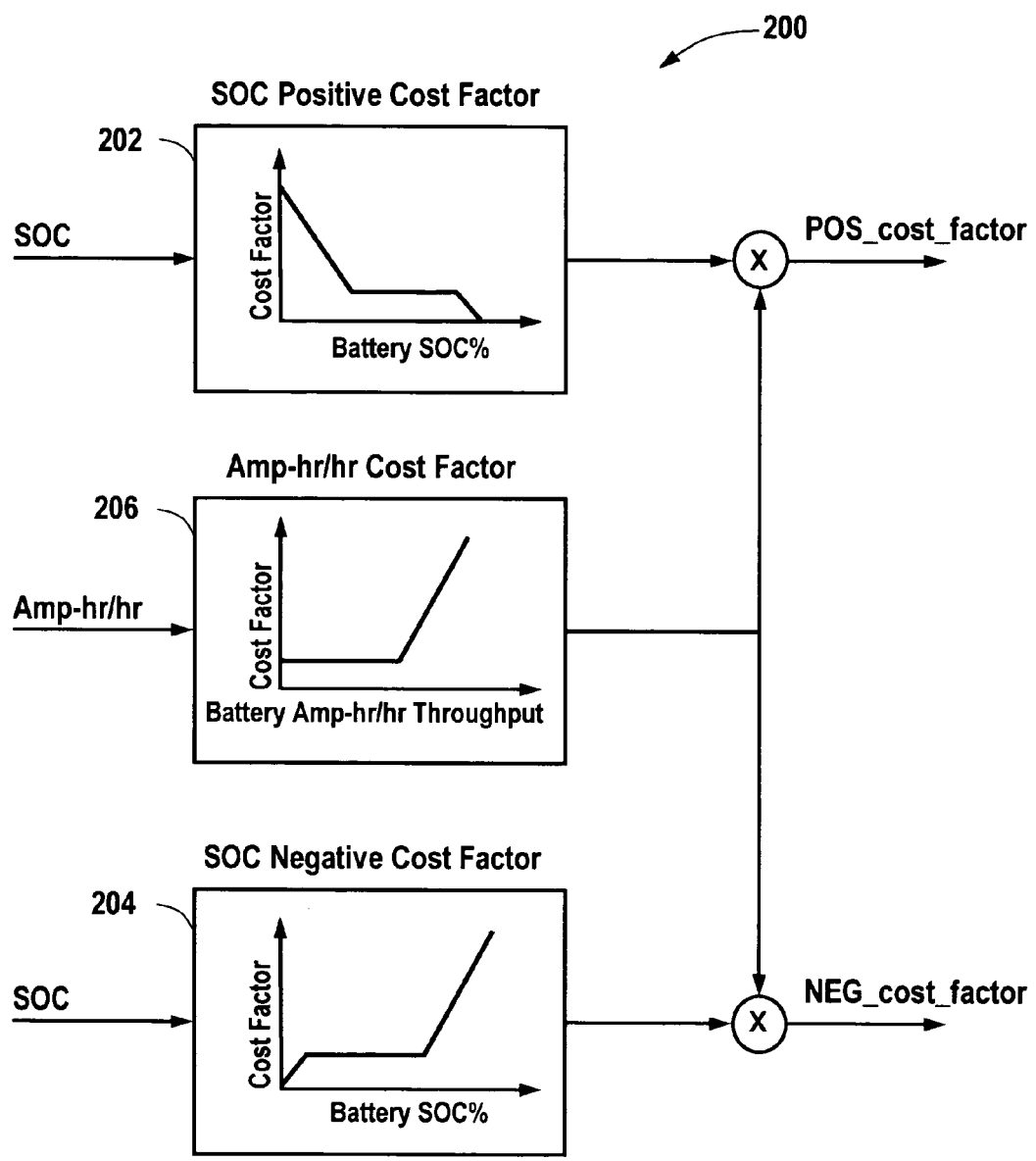
FIG. 12 is a graphical representation of state of charge cost factors across the range of battery states of charge attributed to battery power flows and battery throughput cost factors across the range of battery throughput as utilized in a second determination of battery utilization costs in accordance with the present invention.
Figure 13:
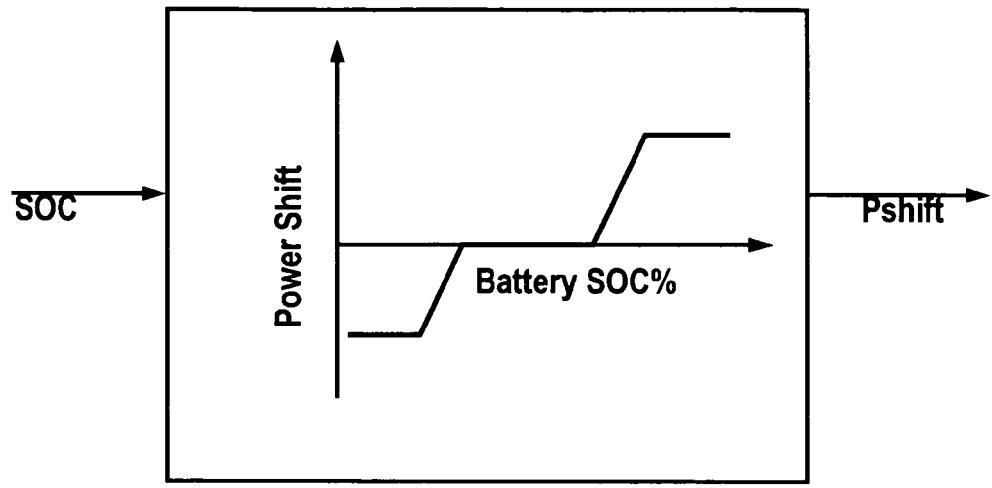
FIG. 13 is a graphical representation of a battery power shift offset utilized in a second determination of battery utilization costs in accordance with the present invention.

Referring to FIG. 12, in a second embodiment, the total subjective cost is determined as shown in block 200 as a function of battery power also using battery parameters which include the SOC and amp-hour per hour throughput to determine the battery costs or penalties. First, battery cost factors are determined using lookup tables based on the state of charge (SOC) of the batteries and the amp-hour per hour throughput of the batteries. Similar to the example above, SOC costs are determined with separate lookup tables as different values of SOC have different costs associated with charging or discharging. Since the sign convention is that positive battery power is discharging, when state of charge SOC is low, additional costs are applied to discharging situations by increasing the SOC positive cost factor as SOC decreases, as illustrated in block 202. When SOC is in the normal range or is high, there is no need to apply additional costs to discharging situations. Similarly, when the SOC is high, additional cost is applied to charging situations by increasing the negative or charging cost factor, as illustrated in block 204. The amp-hour throughput cost factor is determined using a lookup table as a function of the amp-hour per hour throughput of the batteries, as illustrated in block 206. This table produces an amp-hour cost factor that increases as the amp-hour per hour throughput of the batteries increased. This factor is then multiplied by both the positive and negative SOC cost factors to determine the overall positive and negative battery cost factors, respectively. This is so that the amp-hour based cost factor should apply to both charging and discharging.

In addition to the cost factors, a SOC based shift is determined. The SOC shift is used as an additional tool to determine the overall battery cost. When utilized, the cost factors are multiplied by the battery power to determine the actual cost. If the battery power is zero, then the cost factor can have no influence, however, there are situations in which it is desirable to have a cost associated with zero battery power. For example, at low SOC, it is desirable to have a cost associated with zero battery power, as the intention would be to select an operating point that would charge the system. The SOC cost factors would only penalize discharge situations and would not have the capability to encourage charge.

The cost factors are then used to determine the total subjective cost. The battery power, Pbatt, is shifted by the SOC shift value and multiplied by the cost factor to determine the total subjective cost. The following relationships are illustrative:

$$\text{Pcost\_sub} = \begin{cases} \text{NEG\_cost\_factor}(Pbatt - Pshift) & \text{for } Pbatt < 0 \\ \text{POS\_cost\_factor}(Pbatt - Pshift) & \text{for } Pbatt \geq 0 \end{cases}$$

Figure 14A:
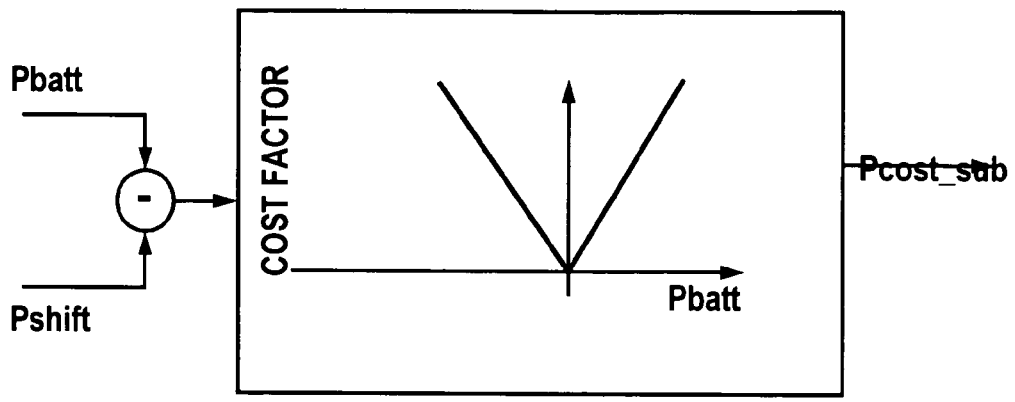
FIGS. 14A-14C are graphical illustrations of the determination of battery utilization costs in accordance with the battery state of charge, battery throughput and battery power shift considerations shown in FIGS. 12 and 13 wherein FIG. 14A graphically illustrates determination of subjective cost at intermediate battery states of charge (SOC), FIG. 14B graphically illustrates determination of subjective cost at low battery states of charge (SOC), and FIG. 14C graphically illustrates determination of subjective cost at high battery states of charge (SOC)
Figure 14B:
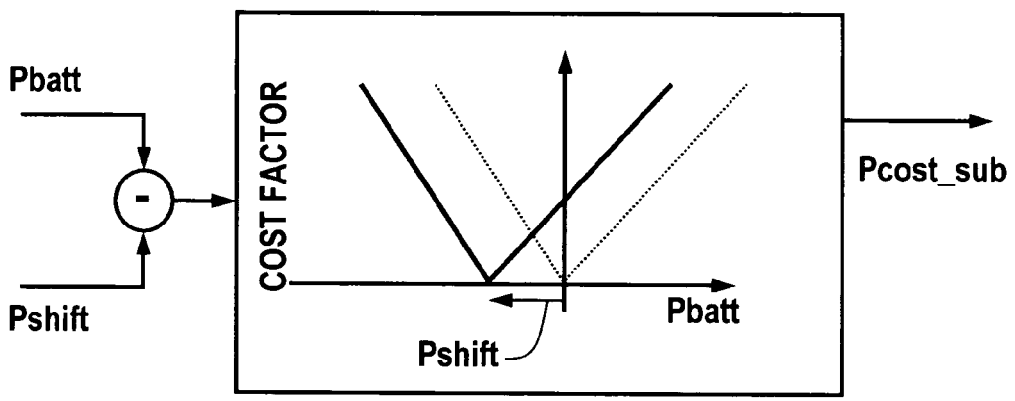
Figure 14C:
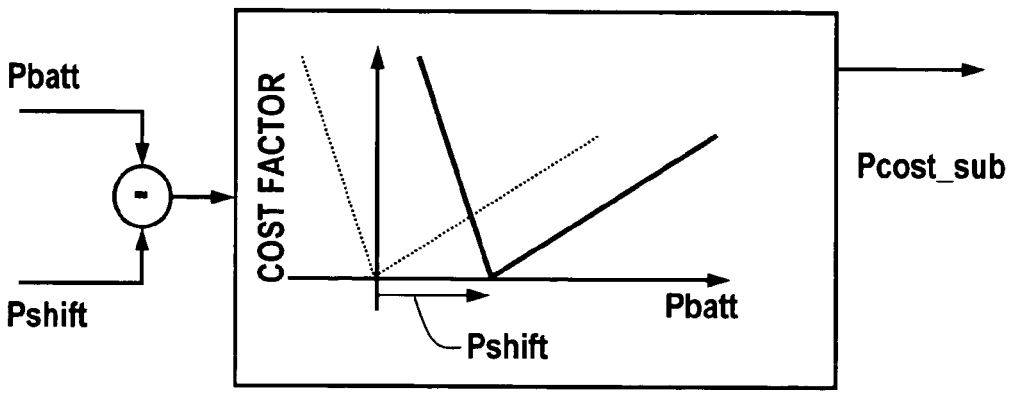

And, these relationships are shown in FIGS. 14A-14C wherein FIG. 14A graphically illustrates determination of subjective cost at intermediate battery states of charge (SOC), FIG. 14B graphically illustrates determination of subjective cost at low battery states of charge (SOC), and FIG. 14C graphically illustrates determination of subjective cost at high battery states of charge (SOC). As can be seen, no power shift is associated with intermediate or "normal" states of charge whereas powershifts are associated with relatively low and high states of charge. When SOC is "low" the shift moves the plot to the left so the zero cost point will be at a charging battery power. When SOC is "high" the shift moves the plot to the right so the zero cost point will be at a discharging battery power. Additionally, the cost factor data may be characterized by varying slope, for example, to define larger cost penalties for operating at lower values of discharge (relative to zero cost battery power) and smaller cost penalties for operating at higher discharge values. Similar variable slopes may define the cost factor data corresponding to cost penalties for low SOC.

Utilizing this method for determining the overall system cost function to include specific battery related terms allows the optimal selection strategy to deviate from the system loss based optimal operating point to an operating point that satisfies battery criteria. The operating point selected may be sub-optimal when only considering the system loss, but will be such that the system loss is as small as possible and battery criteria are satisfied.

Without inclusion of the battery terms into the system cost function, the optimal strategy would select a point that would minimize system loss without regard for the battery utilization. Eventually, selecting operating points in this manner would result in the battery reaching some limit. At which time, the search space of the optimal strategy would be constrained by the hard limits imposed. By adding the battery cost term to the overall system cost function, the results of the optimization routine can be directed to select operating points not only based on the system loss, but also on the impact to the battery system. This allows the selection routine the flexibility to select operating points better suited for the battery system prior to being forced to select these points by hard limits.

Of course, Pcost_sub is scaled into the same units as the subsystem power losses described above. Pcost_sub is therefore similarly seen plotted in FIG. 5 across the exemplary input torque region.

The total loss, Total_loss, is then determined as the summation of the subsystem power losses of Ploss_total and the scaled subjective cost penalties of Pcost_sub as follows:

$$\text{Total\_loss} = P\text{loss\_total} + P\text{cost\_sub}$$

Total_loss is therefore similarly seen plotted in FIG. 5 across the exemplary input torque region.

Step 137 is next encountered whereat a comparison of the Total_loss determined at the evaluation input torque, Ti_n, is compared with the Total_loss determined at the previous evaluation torque, Ti_n-1. A first instance through the routine which would have no such prior Total_loss determination would simply result in the return of the routine to step 133 whereat a second evaluation input torque would be determined in accordance with the golden section ratio considerations.

Step 138 eliminates solution space in input torque to the outside of the one of the evaluation input torques, Ti_n and Ti_n-1, associated with the larger of the respective Total_loss values corresponding thereto. The evaluation input torque, Ti_n or Ti_n-1, associated with the larger of the respective Total_loss values is then established as a new input torque boundary for the range of remaining feasible input torques to be evaluated.

Step 139 next determines if a predetermined number of iterations through the section search has been performed. If not, then the routine returns to step 133 to select another evaluation torque and loop through the routine steps 133-139. When the predetermined number of iterations has been accomplished, then step 140 is encountered whereat the optimum input torque, Ti_opt, is set the one of the current and immediate past evaluation input torques, Ti_n or Ti_n-1, having the corresponding smallest Total_loss associated therewith. The selected value for input torque is now available for use in setting the engine torque. But additional routines related to stability considerations at quiescent conditions are represented at step 141 which reduce the occurrence of frequent torque split changes which may be objectionable. An exemplary quiescent stability routine is explained below in reference to FIGS. 17A and 17B.

A section search performed in accordance with the described golden section ratio reduces the range of feasible input torques upon each subsequent evaluation by a factor of 1-$\Phi$, or approximately 0.38197. Accuracy to within less than 1.0% can be established with eleven such evaluations. Modern engine controls are typically limited to control accuracy of substantially 1.0%. Evaluations beyond eleven are not presently believed to be of significant benefit. Hence, eleven such evaluations with the preferred golden section ratio search is the preferred number of evaluations performed.

Figure 6:
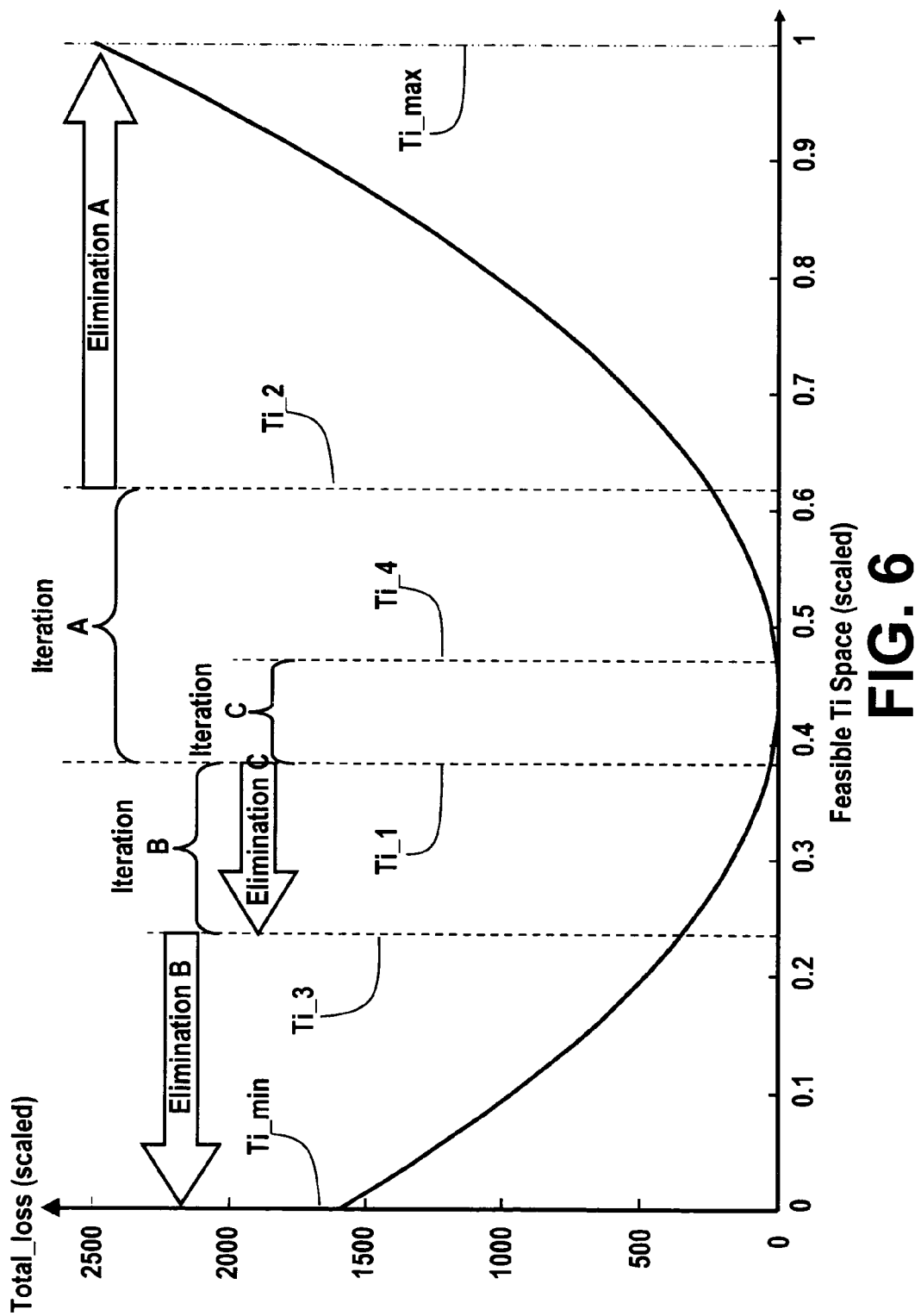
FIG. 6 is a graphical representation of a preferred technique for converging on a minimum system cost operating point in input torque.

Turning now to FIG. 6, an exemplary continuum of a range of input torques scaled between 0 and 1 appears across the horizontal axis. The initial range of the solution space in Ti corresponds to the Ti_min value (scaled to 0) and the Ti_max value (scaled to 1). Corresponding scaled and shifted Total_loss data are plotted against the vertical axis. A first comparison in accordance with the golden section ratio search would correspond to the pair of evaluation input torques associated with lines Ti_1 and Ti_2. Visual inspection confirms that Total_loss at Ti_2 is greater than Total_loss at Ti_1. Hence, the solution space to the outside of Ti_2 is eliminated from further consideration (elimination A) and the new solution space corresponds to the limits of Ti_min and Ti_2 (i.e. Ti_2 is the new Ti_max). In accordance with the golden section ratio criteria, another evaluation input torque is established at Ti_3 relative to the newest limit Ti_2. The lowest Total_loss from the previous iteration corresponding to Ti_1 is compared to the Total_loss from the current iteration corresponding to the newest evaluation input torque, Ti_3. Again from visual inspection it can be appreciated that Total_loss at Ti_3 is greater than Total_loss at Ti_2. Hence, the solution space to the outside of Ti_3 is eliminated from further consideration (elimination B) and the new solution space corresponds to the limits of Ti_3 and Ti_2 (i.e. Ti_3 is the new Ti_min). Once again, in accordance with the golden section ratio criteria, another evaluation input torque is established at Ti_4 relative to the newest limit Ti_3. The lowest Total_loss from the previous iteration corresponding to Ti_1 is compared to the Total_loss from the current iteration corresponding to the newest evaluation input torque, Ti_4. Again from visual inspection it can be appreciated that Total_loss at Ti_2 is greater than Total_loss at Ti_4. Hence, the solution space to the outside of Ti_2 is eliminated from further consideration (elimination C) and the new solution space corresponds to the limits of Ti_1 and Ti_2 (i.e. Ti_1 is the new Ti_min). This process is repeated consistently as described for a predefined number of iterations or comparisons at which point the optimum input torque is established as the one of the last two evaluation input torques corresponding to the smallest of the respective Total_loss values.

Alternative section searches can be employed in similar fashion to converge to an optimum input torque however with lesser efficiencies and uncertainties of reaching particular target accuracies within a known number of iterations or comparisons. Various other methods of solution convergence are also well known and applicable for implementation with the present invention including non-limiting examples of quadratic and other higher-order polynomial estimations and iterative derivative convergence techniques.

Figure 17A:
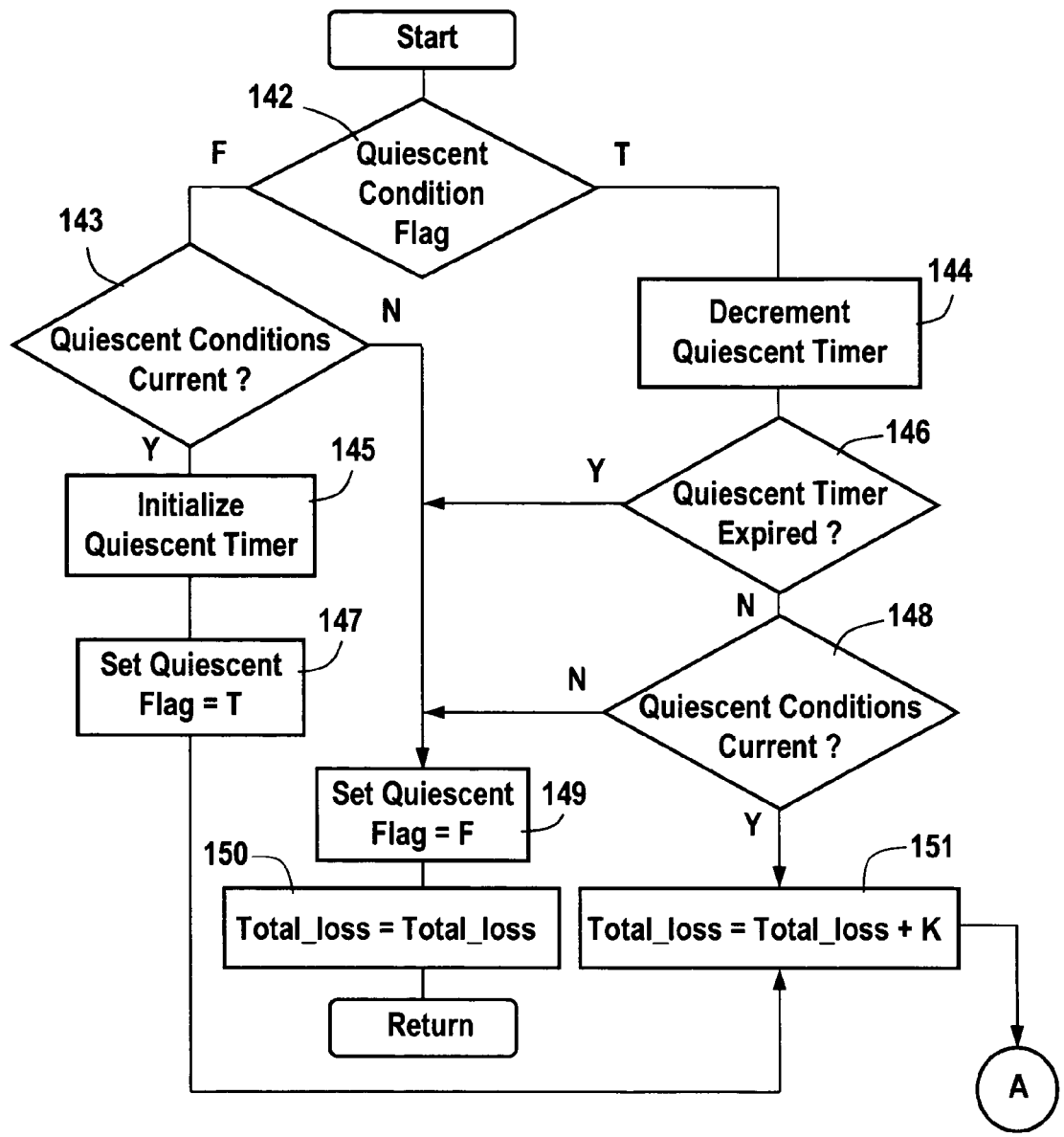

The quiescent stability routine begins in FIG. 17A by checking the state of a quiescent condition flag. A true flag state is indicative of a prior loop quiescent condition while a false state indicates no prior loop quiescent condition. Quiescent condition as used herein is determined by relatively low throttle pedal positions and relatively low vehicle speeds, both of which are preferably determined in accordance with calibratable thresholds. A true flag will pass to step 144 whereat a quiescent timer will be decremented. If the quiescent timer is expired then step 146 will pass control to step 149 whereat the quiescent flag is set to false thus indicating an end of quiescent condition management at this loop. Thereafter, Total_loss for the current loop is set exactly as determined back at the routine of FIG. 15 without any penalty or offset. If the quiescent timer has not expired as determined at step 146, then a check at step 148 is performed on the conditions defining a quiescent state. If quiescent conditions are not present then control similarly passes to step 149 whereat the quiescent flag is set to false thus indicating an end of quiescent condition management at this loop. Thereafter, Total_loss for the current loop is set exactly as determined back at the routine of FIG. 15 without any penalty or offset. Steps 146 and 148 effectively terminate the quiescent management at the present loop if either the quiescent timer expires or the quiescent conditions are no longer present. If neither of those exit conditions is met, then step 151 is executed to assign a penalty or offset, K, to Total_loss determined back at the routine of FIG. 15.

Returning to step 142, a false flag passes control to step 143 whereat a check is performed on the conditions defining quiescent state. If quiescent conditions are not current then control passes to block 149 whereat the quiescent flag is set to false. Thereafter, Total_loss for the current loop is set exactly as determined back at the routine of FIG. 11 without any penalty or offset. If, however, the quiescent conditions are present, then steps 145 and 147 initialize the quiescent timer and set the quiescent flag to true, respectively. Thereafter, control passes to step 151 whereat a penalty or offset, K, is applied to Total_loss determined back at the routine of FIG. 15.

Therefore, quiescent conditions will for at least a predetermined duration result in a penalty or offset being applied to the current loop Total_loss whereas no current quiescent conditions or expiration of the predetermined duration will result in no such penalty or offset being applied. Furthermore as can be seen from FIG. 17A, subsequent to block 150, i.e. expired quiescent timer or no current quiescent conditions, the routine returns and no quiescent condition management steps are taken. But if the quiescent timer has not expired, quiescent conditions are still current and a penalty or offset to Total_loss is applied, then quiescent condition management steps are taken as set out in FIG. 17B.

With respect to the penalty or offset, K, a constant value may be selected for application for Total_loss values of multiple loops executed during the quiescent conditions duration or quiescent timer duration. However, it is also envisioned that the penalty or offset applied may decay for each of subsequent loops during the quiescent conditions duration or quiescent timer duration.

Figure 17B:
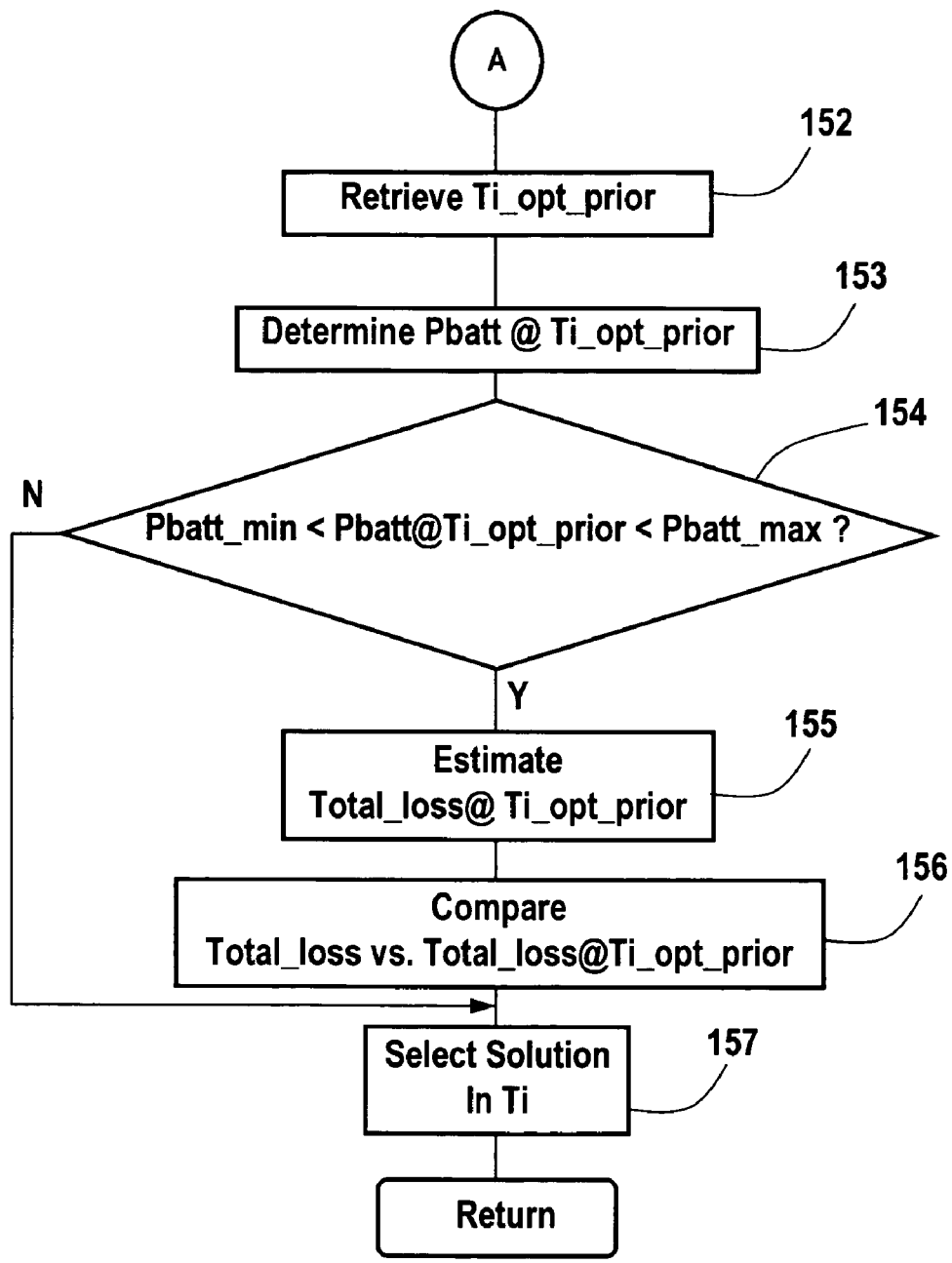

In FIG. 17B, the optimum input torque for the immediately preceding loop, Ti_opt_prior, is retrieved from memory at step 152. Thereafter, step 153 determines the battery power for current conditions at an input torque corresponding to the optimum input torque for the immediately preceding loop, Pbatt@Ti_opt_prior. The methodology for calculating battery powerin the present routine is identical to that described with respect to the routine of FIG. 15, more particularly with respect to the description provided for step 134 thereof. Next, Pbatt@Ti_opt_prior is compared to the minimum and maximum battery power limits at current conditions. This step, too, is accomplished with the same methodology as that described with respect to the routine of FIG. 15, more particularly with respect to the description provided for step 135 thereof. Where Pbatt@Ti_opt_prior is outside of the limits thus indicating an infeasible battery power condition if Ti-opt-prior were utilized in the control of the EVT, control passes to step 157 whereat the input torque selected for control of the EVT is the optimum input torque corresponding to the present loop, Ti_opt. But where Pbatt@Ti_opt_prior is feasible, step 155 is encountered and the various subsystem power losses and subjective costs are determined for current conditions at an input torque corresponding to the optimum input torque for the immediately preceding loop, Total_loss@Ti-_opt_prior. Next at step 156 Total_loss for the present loop, which in the case of the quiescent condition management steps of the present routine includes the penalty or offset, is compared to Total_loss@Ti_opt_prior. Then at step 157 the one of the optimum input torques, Ti_opt or Ti_opt_prior, corresponding to the smaller of the total losses, Total_loss or Total_loss@Ti_opt_prior, is then selected as the optimum input torque to be returned for use in the control of the EVT. Therefore, as can be appreciated, the penalty or offset added to the present loop total loss will bias the system away from changing the input torque to a new setpoint during quiescent conditions unless there is a significant enough improvement in Total_loss to be gained thereby or enough time has passed since the last input toque change that the frequency of input torque change is not objectionable.

The present invention has been described with respect to a particular exemplary hybrid powertrain arrangement. Those skilled in the art will recognize that other hybrid and conventional powertrain arrangements can be used in conjunction with the present invention. For example, conventional electro-hydraulically controlled, multi-speed transmissions can be used in conjunction with the present invention.

While the invention has been described by reference to certain preferred embodiments and implementations, it should be understood that numerous changes could be made within the spirit and scope of the inventive concepts described. Accordingly, it is intended that the invention not be limited to the disclosed embodiments, but that it have the full scope permitted by the language of the following claims.

We claim:

1. Method for determining a preferred input torque for operating an electrically variable transmission (EVT) including an input, an output and an electric machine having known coupling relationships, and an energy storage system (ESS), comprising:
   determining current EVT operating conditions including input, output and electric machine speeds;
   determining system constraints in electric machine torque, ESS power and input torque at current EVT operating conditions;
   providing a target output torque producible within said system constraints;
   calculating aggregate system power losses corresponding to feasible input torques that can produce the target output torque within said system constraints;
   calculating ESS power utilization costs as a function of ESS power corresponding to feasible input torques, wherein the ESS power utilization costs are adapted for application to the aggregate system power losses;
   applying the ESS power utilization costs to the aggregate system power losses to determine total system losses corresponding to feasible input torques that can produce the target output torque within said system constraints;
   converging upon a feasible input torque corresponding to a substantially minimum total system loss; and
   selecting as the preferred input torque the feasible input torque corresponding to the substantially minimum total system loss.

2. The method of claim 1, wherein calculating aggregate system power losses comprises:
   calculating individual sub-system power losses; and
   summing the individual sub-system power losses.

3. The method of claim 2, wherein individual sub-system power losses are selected from the group consisting of an input source power loss, an electric machine power loss and an accessory power loss.

4. The method of claim 1, wherein the ESS power utilization cost is also a function of at least one ESS parameter.

5. The method of claim 4, wherein the at least one ESS parameter comprises a state of charge of the ESS, an amp-hour throughput of the ESS and ESS power.

6. The method of claim 5, wherein calculating ESS power utilization costs as a function of the ESS power further comprises:
   determining a value of at least one ESS parameter; and
   determining the ESS power utilization costs as a function of ESS power and the at least one ESS parameter.

7. The method of claim 6, wherein the at least one ESS parameter comprises a state of charge of the ESS and an amp-hour throughput of the ESS.

8. The method of claim 7, wherein determining the ESS power utilization costs as a function of the ESS power and the at least one ESS parameter, further comprises:
   determining an ESS cost factor as a function of the state of charge and the amp-hour throughput; and
   multiplying the ESS cost factor by the ESS power corresponding to feasible input torques to obtain the ESS power utilization costs.

9. The method of claim 8, further comprising:
   shifting the ESS power by a shift value to a shifted ESS power, wherein the shift value is a function of the state of charge, and wherein multiplying the ESS power by the ESS cost factor utilizes the shifted ESS power.

10. The method of claim 9, wherein the shift value is a function of the state of charge such that at low states of charge the total system power loss is biased in a manner to effect reduced ESS power and at high states of charge the total system loss is biased in a manner to effect increased ESS power.

11. The method of claim 1, wherein said applying the ESS costs to the aggregate power losses to determine total system losses corresponding to feasible input torques that can produce the target output torque within said system constraints, further comprises:
   adding the ESS power utilization costs to the aggregate system power losses to determine the total system losses.

12. The method of claim 1, wherein said preferred input torque is periodically updated, and further wherein such periodic update proceeds during quiescent powertrain operation only when the most recently selected feasible input torque corresponds to a respective substantially minimum total system loss that is at least a predetermined amount less than the respective substantially minimum total system loss corresponding to the previously selected feasible input torque.

13. The method of claim 1, wherein converging upon a feasible input torque comprises performing a section search in feasible input torques and corresponding total system losses.

14. The method of claim 13, wherein said section search comprises a golden section ratio.

15. The method of claim 1, wherein converging upon a feasible input torque comprises performing an iterative derivative convergence.

16. The method of claim 1, wherein converging upon a feasible input torque comprises performing polynomial estimations.

* * * * *